United States Patent [19]
Maynard

[11] 3,842,769
[45] Oct. 22, 1974

[54] SLIP COUPLING FOR SUBMARINE DECKS

[75] Inventor: Arthur W. Maynard, Norwich, Conn.

[73] Assignee: William E. Bonafede, Yantic, Conn.; a part interest

[22] Filed: May 11, 1973

[21] Appl. No.: 358,741

[52] U.S. Cl............... 114/16 R, 403/58, 403/61
[51] Int. Cl.............................................. B63g 8/00
[58] Field of Search............ 114/16 R, 76, 85, 88; 287/21, 87; 285/165; 416/141; 403/58, 59, 61

[56] References Cited
UNITED STATES PATENTS

| 1,434,904 | 11/1922 | Mansfield | 287/21 |
| 2,877,069 | 3/1959 | Dispenza | 287/21 |
| 3,133,754 | 5/1964 | Peters | 285/165 |

Primary Examiner—Trygve M. Blix
Assistant Examiner—Charles E. Frankfort
Attorney, Agent, or Firm—Edward J. Brenner

[57] ABSTRACT

A device for coupling together two bodies having relative motion therebetween, such as a submarine deck and hull, which comprises a bearing member having a generally flat surface on one of its sides, an arm member adapted to be pivotally connected to one of the bodies, a slide member adopted to be fixedly connected to the other of the bodies and having a slot therein adopted to receive the flat surface of the bearing member in slideable relationship therewith, and a concavo-convex connection between the bearing member and the arm member permitting relative movement therebetween. In one embodiment of the invention the device includes a second bearing member adapted to be received in slideable relationship in a second slot in the slide member and a second concavo-convex connection between the second bearing member and the arm member, wherein the concavo-convex connections are hemispherical in shape and the bearing members are constructed of a plastic material having a low coefficient of friction.

8 Claims, 7 Drawing Figures

SLIP COUPLING FOR SUBMARINE DECKS

BACKGROUND OF THE INVENTION

1. Field of the Invention

The present invention relates to devices for coupling together two bodies having relative motion therebetween and more particularly relates to a slip coupling device for connecting together a submarine deck to the internal hull of the submarine.

2. Description of the Prior Art

There are many problems which arise when a submarine is in a transcient mode of operation, which can occur in particular when the submarine is diving or surfacing, in view of the fact that there is a resultant substantial change in the external pressure on the submarine hull. For example, high stress concentrations are developed in platforms which cause crippling and squeaks in vertical partitions and the jamming of partition doors, including high radiated and self noise levels emanating from some of the existing deck connections. The resultant noise in turn interferes with the operations of some of the sophisticated electronic equipment aboard the submarine.

Many attempts, therefore, have been made to develop a mechanism which would avoid the aforementioned high stress concentrations which are developed when a submarine is in a transient mode of operation. Present designs of flex connections for use in submarines use elastomers which must be replaced periodically at great expense. For example, in order to gain access to these connections, many components, pipes, valves, wireways, ventilation ducts, partitions, ceilings, and positions of existing platforms may have to be detached and, in some situations, removed entirely. Further, when piping and valves have to be replaced, they must first be cleaned, inspected and tested which substantially increases the overhaul and replacement cost for the operation.

SUMMARY OF THE INVENTION

The present invention relates to a device for coupling together two bodies having relative motion therebetween, which comprises a bearing member having a generally flat surface on one of its sides, an arm member having one end thereof adapted to being pivotally connected to one of the bodies, a slide member having one end thereof adapted to being fixedly connected to the other of the bodies and including a slot adapted to receive the flat surface of the bearing member in slideable relationship therewith, and a concavo-convex connection between the bearing member and the arm member permitting relative movement therebetween. In one embodiment the device includes a second bearing member having a generally flat surface on one of its sides, a second slot in the slide member adapted to receive the flat surface of the second bearing member in slideable relationship therewith and a second concavo-convex connection between the second bearing member and the arm member permitting movement therebetween, wherein the concavo-convex connections are hemispherical in shape.

An object of the present invention is to provide an improved device for coupling together two bodies that have relative motion therebetween.

A further object of the present invention is to provide an improved slip coupling for connecting together a deck of a submarine with its hull wherein the noise level produced when the submarine is in a transient mode of operation is substantially reduced.

A still further object of the present invention is to provide an improved slip coupling for connecting together a deck of a submarine with its hull, which coupling is relatively simple and inexpensive to manufacture, install and maintain.

Other objects and advantages of the present invention will become apparent from the following description taken in conjunction with the accompanying drawings.

DESCRIPTION OF THE PREFERRED EMBODIMENT

Figure 1:
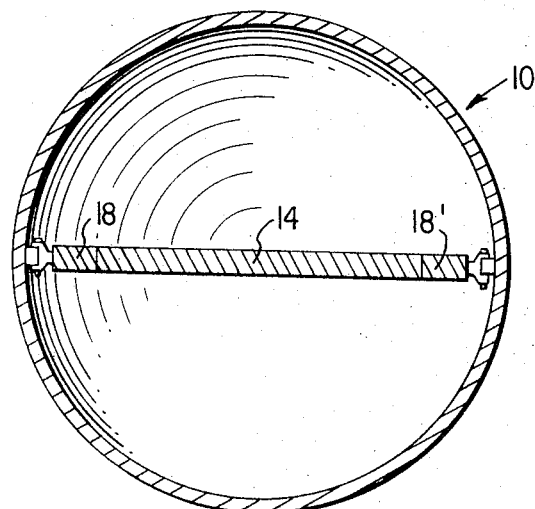
FIG. 1 is a transverse cross-sectional view of a submarine showing a deck connected to the submarine hull by means of slip coupling devices constructed in accordance with the present invention.

A submarine 10, as shown in cross-section in FIG. 1, includes a hull envelope 12 and a horizontally aligned platform or deck 14 disposed within the interior thereof. The deck 14 is fixedly connected to and is supported by the hull 12 by means of a plurality of slip couplings constructed in accordance with the present invention, such as slip couplings 18 and 18' shown in FIG. 1.

Figure 2:
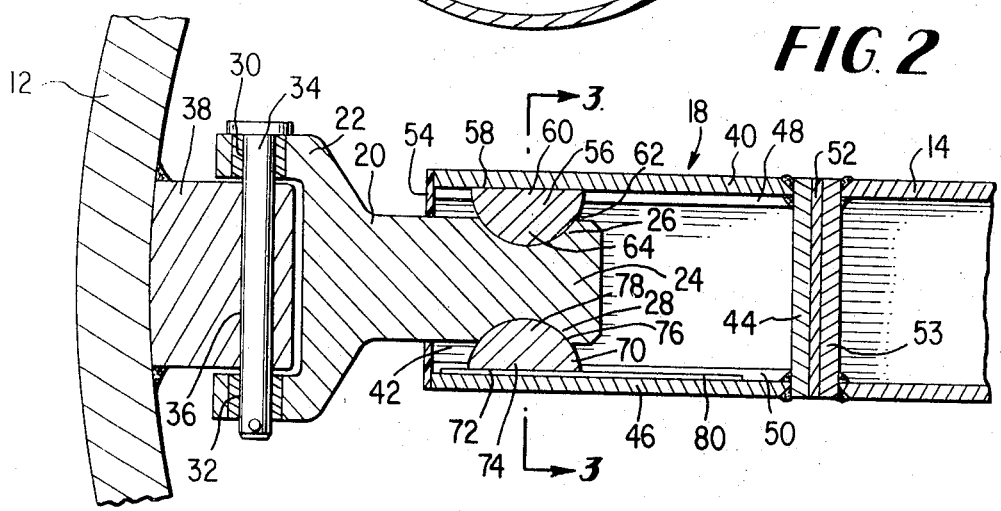
FIG. 2 is an enlarged view in partial cross-section of one of the slip couplings shown in FIG. 1.
Figure 3:
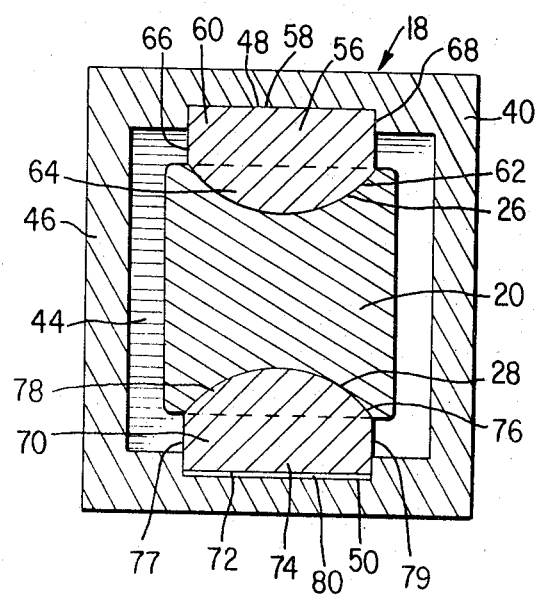
FIG. 3 is a transverse cross-sectional view of the slip coupling taken along the line 3—3 in FIG. 2.
Figure 4:
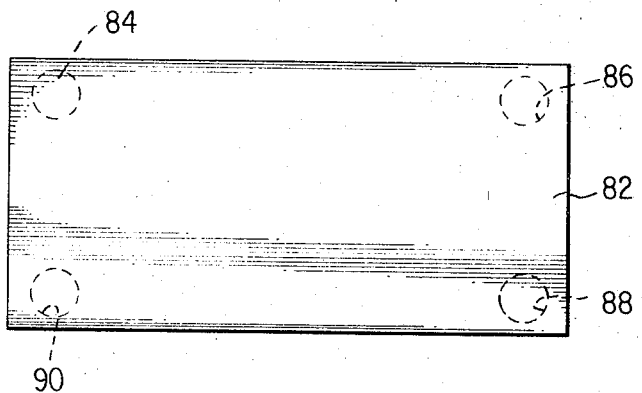
FIG. 4 is a top plan view of the upper section of a spacer member employed to stabilize the lower bearing of the slip coupling of the present invention.
Figure 5:
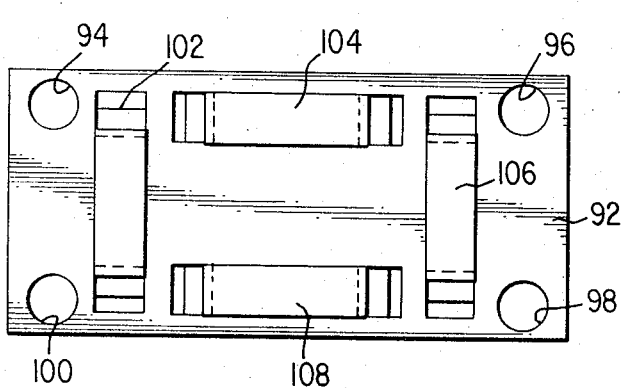
FIG. 5 is a top plan view of the lower section of the spacer member employed to stabilize the lower bearing of the slip coupling of the present invention.

Now referring to FIGS. 2 and 3, slip coupling 18 includes an arm member 20 having a U or clevis-shaped end 22. The other end 24 of arm member 20 is provided with a pair of hemispherically-shaped sockets 26 and 28 disposed on opposite sides thereof in the top and bottom thereof, respectively. The clevis-shaped end 22 of arm member 20 is provided with a pair of vertically-aligned bore holes 30 and 32. A pin or bolt 34 is disposed within bore holes 30 and 32 of arm member 20 and a bore hole 36 of a support member 38 which is mounted on the interior face of hull 12 of submarine 10. Arm member 20 is thus pivotally connected to hull 12 and is adapted to pivot or rotate in a horizontal plane.

The slip coupling 18 also includes a slide member 40 having an open end 42 in which end 24 of arm member 20 is disposed in axial alignment therewith and a closed end 44. Slide member 40 includes a rectangular-shaped tubular housing 46 in which a pair of parallel, spaced and longitudinal aligned slots or grooves 48 and 50 are disposed, respectively, in the upper and lower interior walls thereof. The closed end 44 of slide member 40 is fixedly connected through a spacer shim 52 to a bolting flange 53 which is welded to deck 14 of submarine 10. This closed end 44 of slide member 40 (which may be flanged), spacer shim 52 and bolting flange 53 may be bolted together by a plurality of bolts. The slide member 40 is provided at its open end 42 with a flexible sealing member 54 which encloses end 24 of arm member 20 to effect a sealing action therebetween. The sealing member 54 is employed to prevent the sliding surfaces of the slip coupling 18 from collecting dirt and abrasive material.

Slip coupling 18 also includes an upper bearing member 56 which is generally hemispherical in shape. Bearing member 56 has a flat surface 58 on its upper side 60 and a generally hemispherical-shaped surface 62 on its other, lower side 64. The bearing member 56 also has on its upper side 60 a pair of parallel aligned flat side surfaces or shoulders 66 and 68 disposed on opposite sides of the generally hemispherical-shaped surface 62 and perpendicular to flat surface 58. Thus, in transverse cross-section, as shown in FIG. 3, upper side 60 of bearing member 56 is effectively rectangular in shape and is disposed in slideable relationship in slot 48 of slide member 40. Lower side 64 of bearing member 56 which is hemispherical in shape is disposed in rotational relationship in hemispherically-shaped socket 26 of arm member 20 to provide a concavo-convex connection between bearing member 56 and arm member 20. Thus arm member 20 is adapted to rotate in a vertical and/or horizontal plane relative to bearing member 56 while still maintaining vertical restraint relative to hull 12.

Slip coupling 18 also includes a lower bearing member 70 which is generally hemispherical in shape. Bearing member 70 has a flat surface 72 on its lower side 74 and a generally hemispherical-shaped surface 76 on its other, upper side 78. The bearing member 70 also has on its lower side 74 a pair of parallel, aligned flat side surfaces or shoulders 77 and 79 disposed on opposite sides of the generally hemispherical-shaped surface 76 and perpendicular to flat surface 72. Thus, in transverse cross-section as shown in FIG. 3, lower side 74 of bearing member 70 is effectively rectangular in shape and is disposed in slideable relationship in slot 50 of slide member 40. Upper side 78 of bearing member 70 which is hemispherical in shape is disposed in rotational relationship in hemisperically-shaped socket 28 of arm member 20 to provide a concavo-convex connection between bearing member 70 and arm member 20.

Figure 6:
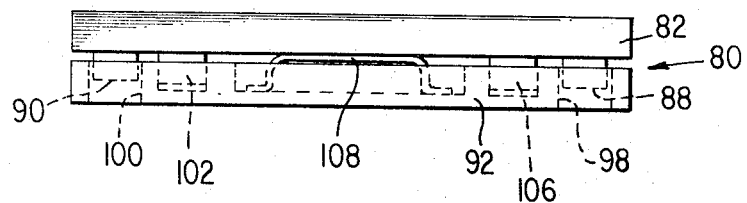
FIG. 6 is a side view of the two sections of the spacer member shown in FIGS. 4 and 5 in their normal operating positions.
Figure 7:
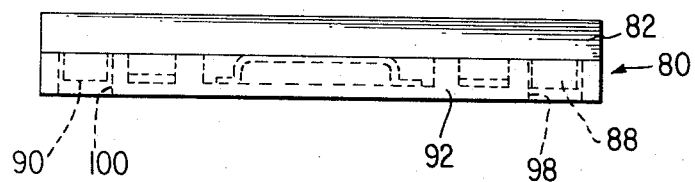
FIG. 7 is a side view of the two sections of the spacer member shown in FIGS. 4 and 5, in their compressed positions.

A spacer member 80 is mounted by bolting or welding in lower slot 50 of slide member 40 to prevent movement of spacer member 80 in slot 50. Spacer member 80 includes an upper plate section 82 having a flat upper surface adapted to engage in sliding relationship with flat surface 72 of lower bearing member 70. Four guide pins 84, 86, 88 and 90 are mounted on the bottom surface of plate section 82, being positioned respectively in approximately the four corners thereof. Spacer member 80 also includes a lower spring section 92 which is provided at its corners with four bore holes 94, 96, 98 and 100 which are adapted to receive the pins 84, 86, 88 and 90, respectively, of plate 82. The spring section 92 is provided with four spaced spring elements or shims 102, 104, 106 and 108. The normal operating position of spacer member 80 is shown in FIG. 6 in which the plate section 82 bears against the flat surface 72 of bearing member 70 to thereby urge the bearing member 70 into a snug fit in socket 28 of arm member 20.

In operation, when submarine 10 is in a transient mode of operation, such as in diving or surfacing, the change in water pressure will result in movement of the hull envelope 12 relative to the deck 14. Such movement, of course, may be in a direction along the X, Y or Z axis (as normally used to describe three dimensional movement) or any combination of such movements. Thus, any coupling means connecting the deck 14 to hull 12 must be capable of three-directional movement. In the case of the present invention, if the relative movement is in a lateral direction, slip coupling 18 will adjust to such movement primarily by means of the movement of arm member 20 and its associated bearing member 56 sliding in slot 48 of slide member 40. It is to be noted that the shoulders of the bearing members 54 and 70 preclude turning of the bearing members in the slots 48 and 50 and in addition have the advantage of minimizing wear. Thus, the design of the bearing members involves no line or point contact, but provides large areas of contact on all their working surfaces.

On the other hand, if the relative movement between the deck 14 and the hull 12 is along the longitudinal axis of the submarine, slip coupling 18 will adjust to such movement primarily by means of the movement between the clevis-shaped end 22 of arm member 20 and its associated pin 34 and by means of the rotational movement between bearing member 56 and socket 26 of arm member 20. And finally, if the relative movement between the deck 14 and hull 12 is in a vertical direction, slip coupling 18 will adjust to such movement primarily by means of the rotational movement between bearing member 56 and socket 26 of arm member 20. Of course, in the case of relative movement in two or three directions, slip coupling 18 will adjust by a combination of the individual movements discussed above.

It should be noted that the load of deck 14 is carried basically by bearing member 56. Thus, bearing member 70 is employed primarily to assist in guiding arm member 20 in its movement in slide member 40 to provide torsional restraint and also to restrain the deck in the event of any sudden vertical shock or negative loads in which the force between deck 14 and hull 12 would shift completely from bearing member 56 to bearing member 70. However, as explained above, in the normal operation of submarine 10 the full load of deck 14 will be carried by bearing 56, so that spacer member 80 is primarily provided to maintain bearing member 70 in a snug fit in socket 28, whereas otherwise it would be loose and could produce a slight rattle. The spacer member 80 will be normally employed in those cases where slip coupling 18 is allowed to translate more than 10° above and below the horizontal axis, and may be used optionally in cases of less than 10°.

The slip couplings of the present invention are relatively simple and inexpensive to manufacture, install and maintain. They can be manufactured from readily available materials by conventional manufacturing methods such as casting, milling, machining, etc. The bearing members are preferably constructed of a plastic material having a low coefficient of friction. It is particularly preferred to employ an acetal fluorocarbon resin for manufacturing the bearing members since such material has a long life and does not require special lubrication. For example, such resins manufactured by E. I. DuPont under the trade name "Delrin" may be advantageously employed for constructing the bearing members. Delrin AF resin is a particularly preferred material. Alternatively the bearing members may be manufactured from steel and coated with Delrin AF resin when high shear and compression loads are anticipated. Also, a product such as Ensolite is a desireable type of material to use for manufacturing the sealing member 54.

While the foregoing describes one specific embodiment of the present invention, it will be understood that the present invention is subject to various modifications within the capabilities of persons skilled in the art. For example, the coupling device may be advantageously used in the construction of bridges, buildings, etc., in addition to submarines. Thus, the present invention can be practiced with a variety of designs without departing from the spirit and scope of the appended claims.

What is claimed is:

1. In a submarine having a hull and at least one internal, generally horizontal deck supported by said hull, the improvement which comprises coupling said deck to said hull with a plurality of coupling devices, each of said coupling devices comprising a bearing member having a bottom bearing surface generally hemispherical in shape and a top bearing surface which is generally flat, a generally horizontal arm member one end thereof being pivotally connected to said hull and the other end thereof having a generally hemispherically shaped socket in the top side thereof, said socket being adapted to receive the hemispherically-shaped surface of said bearing member in rotational relationship therewith, and a slide member having one end there fixedly connected to said deck and including a generally horizontal slot in the upper part thereof adapted to receive the flat surface of said bearing member in slideable relationship therewith.

2. The invention according to claim 1 including a second bearing member having a first bearing surface generally hemispherical in shape on one of its sides and a second generally flat bearing surface on its opposite side, said arm member including a second generally hemispherically-shaped socket in the side thereof opposite said first-mentioned hemispherically shaped socket, said second socket being adapted to receive the hemispherically-shaped surface of said second bearing member in rotational relationship therewith, and said slide member including a second slot in parallel spaced relationship to said first-mentioned slot and adapted to receive the flat surface of said second bearing member in slideable relationship therewith.

3. The invention according to claim 2 wherein said slide member includes a spacer member mounted in one of said slots and adapted to bear against the flat bearing surface of the associated bearing member to thereby urge the hemispherical surface thereof into the associated socket of said arm member.

4. The invention according to claim 1 wherein the end of said arm member connected to said hull is clevis-shaped and is provided with a pair of aligned bore holes in the clevis-shaped portion thereof, said coupling device including a vertically disposed pin pivotally mounted in the bore holes of said clevis-shaped portion of said arm member and a support element connected to said hull pivotally engaging said pin.

5. The invention according to claim 1 wherein said bearing member is made of a plastic material having a low coefficient of friction.

6. The invention according to claim 5 wherein said plastic is an acetal fluorocarbon resin.

7. The invention according to claim 1 wherein said slide member includes a rectangular-shaped housing and the end thereof adjacent said hull is provided with a flexible sealing element between said housing and said arm member.

8. In combination with two bodies having relative motion therebetween and in which one of said bodies supports the other of said bodies wherein said one body is a submarine and said other body is an internal submarine deck, a coupling device which comprises a bearing member having a bottom bearing surface generally hemispherical in shape and a top bearing surface which is generally flat, a generally horizontal arm member one end thereof being pivotally connected to one of said bodies and the other end thereof having a generally hemispherically-shaped socket in the top side thereof, said socket being adapted to receive the hemispherically-shaped surface of said bearing member in rotational relationship therewith, and a slide member having one end thereof fixedly connected to the other of said bodies and including a generally horizontal slot in the upper portion thereof adapted to receive the flat surface of said bearing member in slideable relationship therewith.

* * * * *